United States Patent [19]
Berger

[11] Patent Number: 5,979,930
[45] Date of Patent: Nov. 9, 1999

[54] GAS BAG MODULE

[75] Inventor: Jürgen Berger, Mutlangen, Germany

[73] Assignee: TRW Occupant Restraint Systems GmbH, Alfdorf, Germany

[21] Appl. No.: 09/001,060

[22] Filed: Dec. 30, 1997

[30]     Foreign Application Priority Data

Jan. 22, 1997 [DE] Germany ................. 297 01 063 U

[51] Int. Cl.⁶ ................................................. B60R 21/16
[52] U.S. Cl. ...................................... 280/728.2; 280/741
[58] Field of Search ................................ 280/740, 741, 280/728.2, 739, 742, 736

[56]          References Cited

U.S. PATENT DOCUMENTS 3,708,181  1/1973  Mazelsky ................... 280/740
  5,332,256  7/1994  Lauritzen et al. ........ 280/728.2
  5,509,686  4/1996  Shepherd et al. .......... 280/738
  5,560,643 10/1996  Lang et al. ............. 280/728.2
  5,788,274  8/1998  Gunn ...................... 280/736

*Primary Examiner*—Paul N. Dickson
*Attorney, Agent, or Firm*—Tarolli, Sundheim, Covell, Tummino & Szabo LLP

[57]           ABSTRACT

A gas bag module of a vehicle occupant restraint system has a substantially tubular gas generator, a gas bag, and a gutter-shaped mounting housing surrounding the gas generator. The mounting housing is provided with an elongated slot for fastening the gas generator to a vehicle and has opposite walls delimiting the elongated slot. The walls have terminal edges and are bent in a U-shape to define portions with a double layer. The layer of both portions which is provided with the terminal edge extend towards the gas generator so that the terminal edge lies against the gas generator.

6 Claims, 2 Drawing Sheets

GAS BAG MODULE

FIELD OF THE INVENTION

The invention relates to a gas bag module of a vehicle occupant restraint system.

BACKGROUND OF THE INVENTION

A gas bag module known from DE 44 15 374 has a gas generator which is clamped into a hose-clamp-like housing part of a box-shaped compressed gas container. The compressed gas container is open on its upper side and its surrounding rim is engaged behind by the edge of the rim of the inflation opening of the gas bag.

Furthermore, gas bag modules are known in which the gas bag rim, surrounding the inflation orifice, is clamped between a frame piece arranged in the interior of the gas bag and the surrounding rim of a compressed gas container.

BRIEF SUMMARY OF THE INVENTION

The invention provides a gas bag module which consists of fewer components and can be mounted quickly.

The gas bag module according to the present invention has a substantially tubular gas generator, a gas bag, and a gutter-shaped mounting housing surrounding the gas generator. The mounting housing is provided with an elongated slot for fastening of the gas generator to a vehicle and has opposite walls delimiting the elongated slot. The walls have terminal edges and are bent in a U-shape to define portions with a double layer. The layer of both portions which is provided with the terminal edge extend towards the gas generator so that the terminal edge lies against the gas generator. Separate clamps for fastening the gas generator are no longer necessary in the gas bag module according to the invention. By means of U-shape, the walls are given an excellent elastic flexibility, whereby their terminal edge always presses with a certain minimum force against the gas generator.

According to a preferred embodiment, the portions of the walls having a double-layer extend laterally outwards and form two flanges for the fastening of the mounting housing to the vehicle. The walls, therefore, have a dual function, in which, on the one hand, they provide for the clamping of the gas generator and, on the other hand, they serve as flanges for fastening. In addition, when the flanges are screwed, for example, to the vehicle, the two layers of the wall are pressed against each other, so that the inwardly directed terminal edges are pressed even more strongly against the gas generator. The mounting housing is distinguished by a low weight, because flanges which are separately welded on or formed on are not necessary. The gas generator is secured on the mounting housing and not directly also with the gas bag, so that the gas bag and gas generator can have a certain distance from each other and the inflation orifice can be placed in a region in which it is less stressed thermally by the outflowing gas.

DETAILED DESCRIPTION OF THE INVENTION

Figure 1:
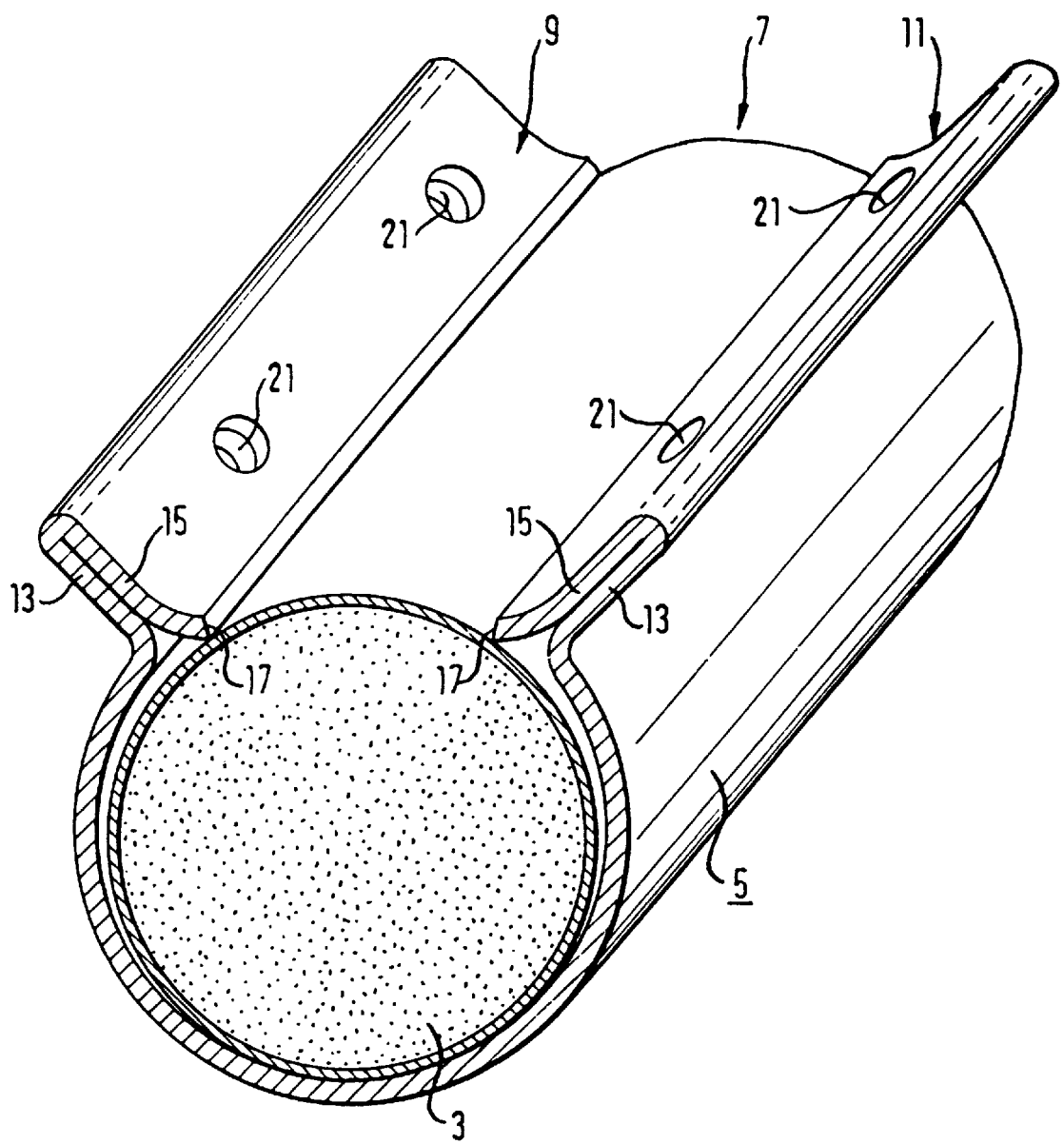
FIG. 1 shows a perspective sectional view of the gas bag module according to the invention, without the gas bag.

In FIG. 1 a gas bag module is shown which has a conventional tubular gas generator 3. The gas generator 3 is surrounded by a gutter-shaped mounting housing 5 of sheet metal, which serves for the fastening of the gas generator 3 on the vehicle. As a result of the gutter shape, an elongated slot 7 is produced which is delimited by opposite walls 9 and 11 of the mounting housing 5. The walls 9, 11, which project laterally outwards, have end portions with a double layer formed by U-shaped bending. Both layers 13, 15 of each wall 9, 11 can even lie against each other here. Each layer 15, which also has the terminal edge 17, i.e. the end of the mounting housing 5 on the circumferential side, projects towards the gas generator 3. The terminal edge 17 presses the gas generator 3 into the mounting housing 5 and thereby clamps it. Between the two terminal edges 17 and the gas generator 5, a line contact is produced over the entire length of the gas generator 3.

The walls 9, 11 also serve as flanges for the fastening of the mounting housing 5 to the vehicle. For this purpose, several fastening openings 21 are provided in the walls 9, 11, which penetrate through both layers 13, 15 of each wall 9, 11. The double-layer portions of the walls 9, 11 in the embodiment shown include an obtuse angle with each other. On screwing the mounting housing 5 to the dashboard panel, the layer 13 is pressed against a corresponding flange on the vehicle, so that the terminal edges 17 are pressed still further inwards, and thereby exert a higher clamping force onto the gas generator 3. The terminal edges 17 can be sharp-edged or, as shown in FIG. 2, constructed with a chamfer.

As a result of the construction shown, in a simple manner a positionally secure arresting of the gas generator 3 in the mounting housing 5 is achieved, even after several years' driving. Due to the U-shaped bending of the walls 9, 11, spring elements are formed, so that the terminal edges 17 lie pretensioning force against the gas generator 3. Certain jigging actions can thereby not lead to the loosening of the gas generator 3 in the mounting housing 5. Due to the spring action of the walls 9, 11, the outer circumference of the gas generator 3 can also be subject to certain tolerances, without this having a negative effect on the fastening of the gas generator 3 in the mounting housing 5.

Figure 2:
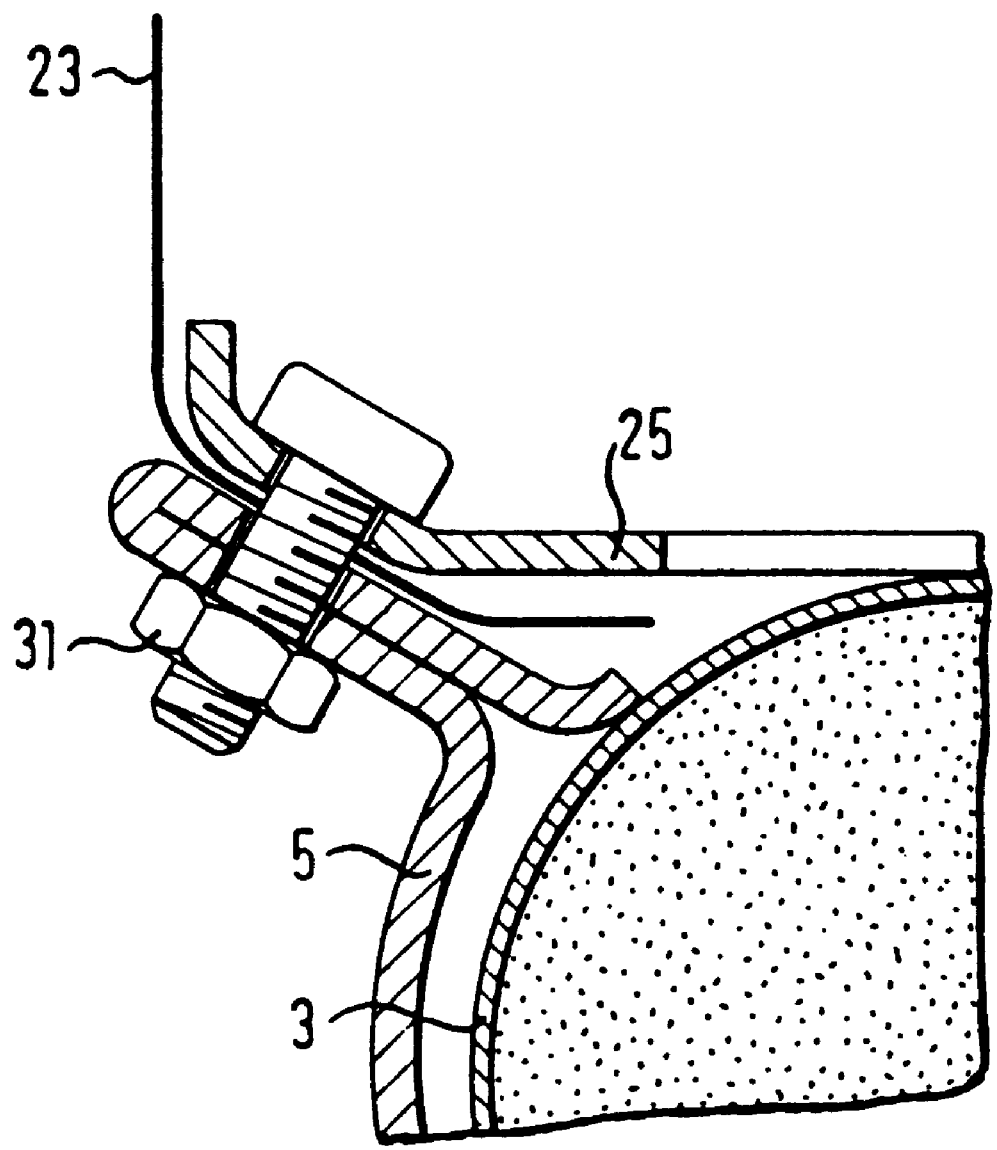
FIG. 2 shows a detail of the gas bag module according to FIG. 1, which shows the fastening of the gas bag on the mounting housing.

The gas bag 23 indicated in FIG. 2 is fastened via a frame piece 25, placed into it and surrounding its inflation orifice, to the walls 9, 11 by means of screw/nut connections 31. For this purpose, the wall section surrounding the inflation orifice is clamped between the frame piece 25 and the walls 9, 11, more precisely the layer 15 of each wall 9, 11. The same screw/nut connections 31 also serve for the fastening of the gas bag module to the vehicle.

Outflow openings in the gas generator 3, via which the produced gas flows out from the gas generator 3 in the case of restraint, can be provided on the end face and/or on the covering surface side in the gas generator 3.

I claim:

1. A gas bag module of a vehicle occupant restraint system, having a substantially tubular gas generator, a gas bag, and a gutter-shaped mounting housing surrounding said gas generator, said mounting housing being provided with an elongated slot for fastening of said gas generator to a vehicle and having opposite walls delimiting said elongated slot, said walls having terminal edges and being bent in a U-shape to define portions with a double layer, and the layer of both portions, which is provided with said terminal edge, extending towards said gas generator so that said terminal edge lies against said gas generator.

2. The gas bag module according to claim 1, wherein said portions of said walls having said double-layer extend laterally outwards and form two flanges for fastening of said mounting housing to the vehicle.

3. The gas bag module according to claim 2, wherein said portions of said walls having said double-layer include an obtuse angle with each other.

4. The gas bag module according to claim 2, wherein said gas bag has an inflation orifice and is fastened to said flanges via a frame piece placed in the gas bag and surrounding said inflation orifice.

5. The gas bag module according to claim 4, wherein said gas bag has a wall section surrounding said inflation orifice, said wall section being clamped between said frame piece and said flanges.

6. The gas bag module according to claim 2, wherein said flanges have fastening openings.

* * * * *